(12) United States Patent
Kodaira et al.

(10) Patent No.: US 12,344,494 B2
(45) Date of Patent: Jul. 1, 2025

(54) PROCESSING SYSTEM

(71) Applicant: SEIKO EPSON CORPORATION, Tokyo (JP)

(72) Inventors: Hirohisa Kodaira, Shiojiri (JP); Chiaki Shimada, Okaya (JP); Kohei Ueno, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 31 days.

(21) Appl. No.: 17/813,505

(22) Filed: Jul. 19, 2022

(65) Prior Publication Data
US 2023/0017851 A1  Jan. 19, 2023

(30) Foreign Application Priority Data

Jul. 19, 2021 (JP) ................... 2021-118579

(51) Int. Cl.
| | |
|---|---|
| *B65H 29/60* | (2006.01) |
| *B65H 3/06* | (2006.01) |
| *B65H 7/20* | (2006.01) |
| *H04N 1/00* | (2006.01) |

(52) U.S. Cl.
CPC .......... *B65H 3/0607* (2013.01); *B65H 3/063* (2013.01); *B65H 7/20* (2013.01); *B65H 29/60* (2013.01); *H04N 1/00602* (2013.01); *H04N 1/00631* (2013.01); *H04N 1/00689* (2013.01); *B65H 2513/42* (2013.01); *B65H 2553/30* (2013.01); *B65H 2553/40* (2013.01)

(58) Field of Classification Search
CPC ........ B65H 3/0607; B65H 3/063; B65H 7/20; B65H 29/60; B65H 2513/42; B65H 2553/30; B65H 2553/40; H04N 1/00602; H04N 1/00631; H04N 1/00689
See application file for complete search history.

(56) References Cited

U.S. PATENT DOCUMENTS

| | | | | |
|---|---|---|---|---|
| 5,207,412 A | * | 5/1993 | Coons, Jr. ................. | B42C 1/10 |
| | | | | 270/52.02 |
| 11,120,669 B2 | * | 9/2021 | Bruce ...................... | G07D 7/04 |

(Continued)

FOREIGN PATENT DOCUMENTS

| | | |
|---|---|---|
| JP | 2009-292055 | 12/2009 |
| JP | 2015-011150 | 1/2015 |
| JP | WO2018105325 | * 6/2018 |

*Primary Examiner* — Thomas A Morrison
(74) *Attorney, Agent, or Firm* — WORKMAN NYDEGGER

(57) ABSTRACT

A processing system includes a stacker on which at least one medium recorded with an image is stacked, a holding unit configured to hold the medium, a processing path extending from the stacker to the holding unit, a pick roller configured to transport the medium from the stacker to the processing path, a reading unit configured to read the medium transported through the processing path, and a control unit configured to store indication data indicating an index of whether to transport a medium to the holding unit, wherein, when receiving a processing instruction from a user, the control unit is configured to cause the pick roller to transport a medium from the stacker to the processing path, and determine whether to transport the medium to the holding unit, based on read data and the indication data, the read data being acquired by reading the medium by the reading unit.

8 Claims, 8 Drawing Sheets

(56) References Cited

U.S. PATENT DOCUMENTS

| | | | |
|---|---|---|---|
| 2012/0012436 A1* | 1/2012 | Nakamoto | G07D 11/50 |
| | | | 194/215 |
| 2012/0025454 A1* | 2/2012 | Iguchi | B65H 29/62 |
| | | | 271/265.01 |
| 2015/0069694 A1* | 3/2015 | Taki | B65H 3/46 |
| | | | 271/3.19 |

* cited by examiner

PROCESSING SYSTEM

The present application is based on, and claims priority from JP Application Serial Number 2021-118579, filed Jul. 19, 2021, the disclosure of which is hereby incorporated by reference herein in its entirety.

BACKGROUND

1. Technical Field

The present disclosure relates to a processing system.

2. Related Art

As one example of a processing system, JP-A-2009-292055 describes an image formation device including a stacker on which a medium having an image recorded thereon is stacked, a holding unit that holds the medium, and a reading unit that reads the medium. The image formation device determines whether to transport the medium to the holding unit, based on a reading result of the reading unit. The image formation device processes the medium by transporting the medium to the holding unit.

In the image formation device described in JP-A-2009-292055, when the medium is left on the stacker for a certain time period, the reading unit reads the medium. The image formation device specifies a user from the reading result, and notifies the user that the medium is left on the stacker. When the medium is still left on the stacker even after the user is notified that the medium is left on the stacker, the image formation device transports the medium to the holding unit. In this manner, when it is determined, based on the reading result, that the user does not collect the medium from the stacker, the image formation device processes the medium.

In the processing system as described in JP-A-2009-292055, the medium is automatically transported from the stacker to the holding unit after elapse of a time period. Thus, there may be a risk that the medium is automatically transported from the stacker to the holding unit against the intention of the user. Therefore, there is room for improvement in usability of the processing system.

SUMMARY

In order to solve the above-mentioned problem, a processing system includes a stacker on which at least one medium recorded with an image is stacked, a holding unit configured to hold the medium, a processing path extending from the stacker to the holding unit, a pick roller configured to transport the medium from the stacker to the processing path, a reading unit configured to read the medium transported through the processing path, and a control unit configured to store indication data indicating an index of whether to transport a medium to the holding unit, wherein, the control unit is configured to, when receiving a processing instruction from a user, cause the pick roller to transport a medium from the stacker to the processing path and determine whether to transport the medium to the holding unit, based on read data and the indication data, the read data being acquired by reading the medium by the reading unit.

DESCRIPTION OF EXEMPLARY EMBODIMENTS

First Exemplary Embodiment

With reference to the drawings, description is given on a sorting device including a recording device being a processing system according to a first exemplary embodiment. The recording device is, for example, an ink jet-type printer that records an image such as characters and photographs on a medium such as a sheet and fibers by ejecting ink, which is an example of liquid.

Figure 1:
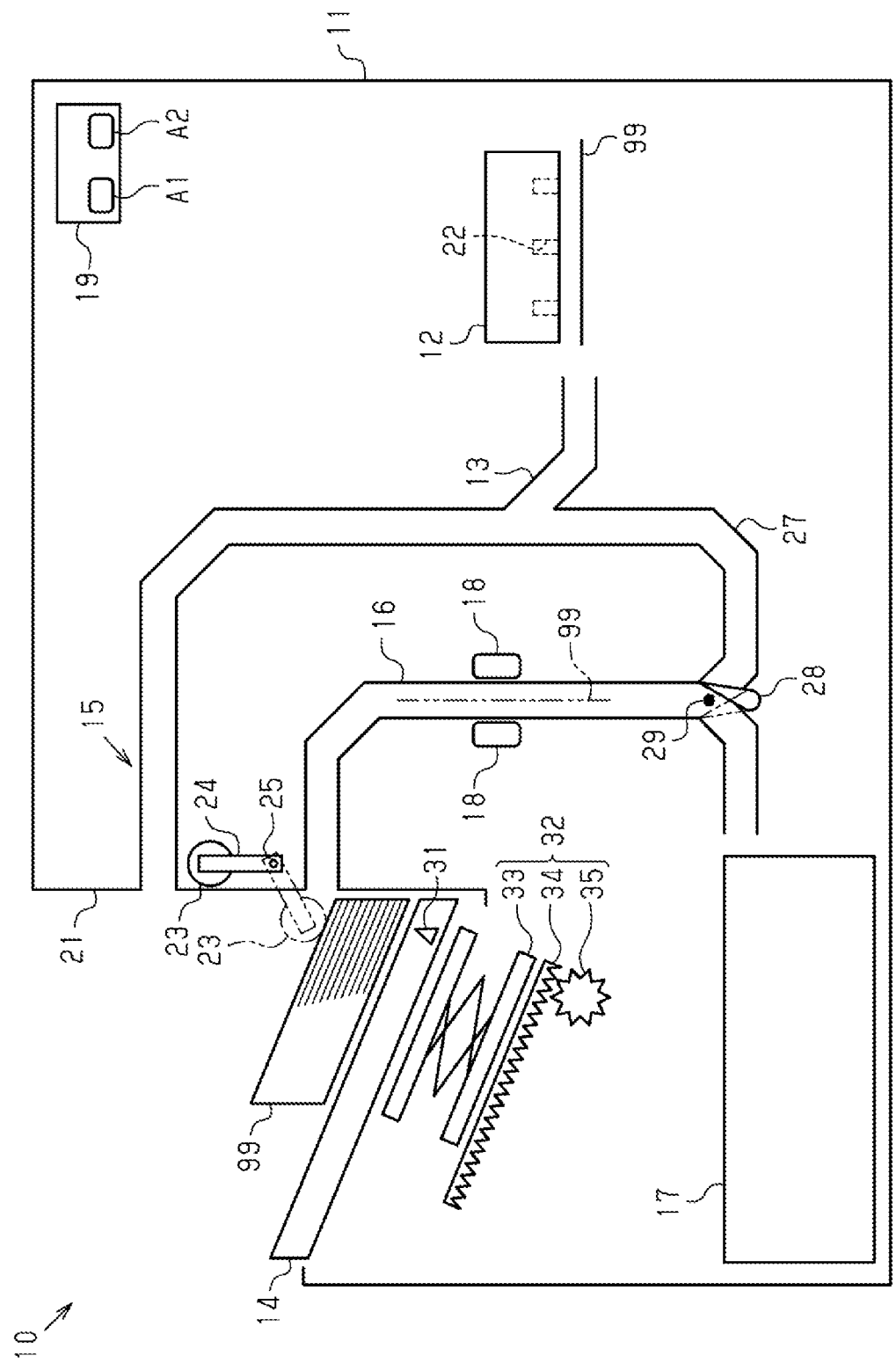
FIG. 1 is a side view of a recording device, for illustrating a processing system according to a first exemplary embodiment.

As illustrated in FIG. 1, a recording device 10 includes a housing 11, a recording unit 12, a discharge path 13, a stacker 14, a transport unit 15, a processing path 16, a holding unit 17, a reading unit 18, and a control unit 19.

The housing 11 accommodates various configurations included in the recording device 10. In the first exemplary embodiment, the housing 11 has an opening surface 21. In the opening surface 21, the end of the discharge path 13 and the end of the processing path 16 are opened.

The recording unit 12 is configured to perform recording on a medium 99. In the first exemplary embodiment, the recording unit 12 is a head. The recording unit 12 includes one or more nozzles 22. The recording unit 12 records an image on the medium 99 by ejecting liquid from the nozzle 22 onto the medium 99. The recording unit 12 records an image on the medium 99, based on image data transmitted from a user, for example. In the first exemplary embodiment, the recording unit 12 is accommodated in the housing 11. The recording unit 12 may perform recording, not only by ejecting the liquid onto the medium 99, but also by fixing a powder body on the medium 99, for example. In other words, the recording device 10 may be a laser printer.

The discharge path 13 is a path through which the medium 99 after recording by the recording unit 12 is discharged. The discharge path 13 extends in the housing 11. The discharge path 13 extends from the recording unit 12 to the stacker 14. In the first exemplary embodiment, the terminal end of the discharge path 13 is opened in the opening surface 21. The medium 99 after recording by the recording unit 12 is transported in the discharge path 13, and then is discharged on the stacker 14. The medium 99 discharged from the discharge path 13 falls onto the stacker 14.

The stacker 14 is located at a position of receiving the medium 99 discharged from the discharge path 13. In the first exemplary embodiment, the stacker 14 is adjacent to the opening surface 21. The stacker 14 extends from the opening surface 21. The stacker 14 is located below the terminal end of the discharge path 13. Thus, the stacker 14 receives the medium 99 falling from the terminal end of the discharge path 13. As a result, one or more media 99 having an image recorded thereon are stacked on the stacker 14.

In the first exemplary embodiment, the stacker 14 is inclined so as to have a distal end located above its base end. The base end of the stacker 14 is an end adjacent to the opening surface 21. The medium 99 discharged on the stacker 14 slides on the stacker 14 so that the end thereof abuts against the opening surface 21. As a result, the plurality of media 99 having aligned ends are stacked on the stacker 14.

The transport unit 15 is configured to transport the medium 99. The transport unit 15 includes, for example, a roller, a belt, and the like. The transport unit 15 transports the medium 99 along the discharge path 13 and the processing path 16, for example. In the first exemplary embodiment, the transport unit 15 includes a pick roller 23. The transport unit 15 includes a plurality of rollers arranged along the discharge path 13 and the processing path 16 in addition to the pick roller 23, but only the pick roller 23 is illustrated in FIG. 1.

The pick roller 23 contacts with the medium 99 stacked on the stacker 14. The pick roller 23 rotates, and thus transports the medium 99 from the stacker 14 to the processing path 16. In the first exemplary embodiment, the pick roller 23 contacts with the medium 99 stacked on the stacker 14 from above. When the plurality of media 99 are stacked on the stacker 14, the pick roller 23 contacts with the uppermost medium 99 of the plurality of media 99 stacked on the stacker 14. Therefore, the pick roller 23 transports the plurality of media 99 to the processing path 16 sequentially from the uppermost medium 99.

In the first exemplary embodiment, the transport unit 15 includes an arm 24 that supports the pick roller 23. The arm 24 rotatably supports the pick roller 23. The arm 24 includes a shaft 25. The arm 24 is mounted to the housing 11 through intermediation of the shaft 25.

The arm 24 is configured to rotate about the shaft 25. Thus, the arm 24 rotates with respect to the housing 11. When the arm 24 rotates, the pick roller 23 moves with respect to the housing 11. With this, the pick roller 23 is displaced at a position of contacting with the medium 99 stacked on the stacker 14 and a position of not contacting with the medium 99.

The pick roller 23 is normally located at the position of not contacting with the medium 99. When the medium 99 is transported from the stacker 14 in the processing path 16, the pick roller 23 is located at the position of contacting with the medium 99.

The pick roller 23 indicated with the solid line in FIG. 1 is located at the position of not contacting with the medium 99. In this case, the pick roller 23 is accommodated in the housing 11. Thus, when the pick roller 23 is located at the position of not contacting with the medium 99, the medium 99 falling from the discharge path 13 is not prevented from being stacked on the stacker 14.

The pick roller 23 indicated with the two-dot chain line in FIG. 1 is located at the position of contacting with the medium 99. In this case, the pick roller 23 protrudes from the housing 11. Specifically, the pick roller 23 protrudes from the opening surface 21.

The processing path 16 is a path extending from the stacker 14 to the holding unit 17. The processing path 16 extends in the housing 11. The medium 99 is transported in the processing path 16, and thus is transported from the stacker 14 to the holding unit 17. In the first exemplary embodiment, the starting end of the processing path 16 is opened in the opening surface 21. The starting end of the processing path 16 is located below the terminal end of the discharge path 13 in the opening surface 21.

The holding unit 17 is configured to hold the medium 99. Specifically, the holding unit 17 holds the medium 99 having an image recorded thereon. The holding unit 17 is a cassette, a tray, a box, or the like that holds the medium 99, for example. The holding unit 17 may be configured to break up the medium 99 into pieces. In other words, the holding unit 17 may be a paper-shredder. In this case, the holding unit 17 holds the shredded medium 99. The recording device 10 processes the medium 99 by transporting the medium 99 from the stacker 14 to the holding unit 17. The recording device 10 transports the medium 99 to the holding unit 17 for the purpose of protecting confidential information recorded on the medium 99, for example.

The reading unit 18 is configured to read the medium 99 in transport through the processing path 16. Thus, the reading unit 18 is located along the processing path 16. In the first exemplary embodiment, the recording device 10 includes two reading units 18. The two reading units 18 are located so as to sandwich the processing path 16 therebetween. In other words, the processing path 16 extends between the two reading units 18.

The two reading units 18 read the front surface and the back surface of the medium 99. In other words, in the first exemplary embodiment, the two reading units 18 read both the surfaces of the medium 99. The recording device 10 is not limited to the configuration of reading both the surfaces of the medium 99, but may have a configuration of reading only one surface of the medium 99 by the single reading unit 18, for example. The reading unit 18 reads the medium 99, and thus acquires read data A1. The reading unit 18 transmits the acquired read data A1 to the control unit 19.

In the first exemplary embodiment, the reading unit 18 includes an image sensor. In the first exemplary embodiment, the reading unit 18 is an image scanner that reads an image recorded on the medium 99 in full color. Thus, the read data A1 is scan data of the image recorded on the medium 99.

The reading unit 18 may be a bar code scanner that reads a bar code. In this case, when an image is recorded on the medium 99, the recording unit 12 also records a bar code. The read data A1 is wave form data acquired from the bar code.

The control unit 19 collectively controls the recording device 10. The control unit 19 controls, for example, the recording unit 12, the transport unit 15, the reading unit 18, and the like. The control unit 19 may be configured as a circuit including α: one or more processors that executes various processing in accordance with a computer program, β: one or more dedicated hardware circuits such as an integrated circuit for a specific purpose that executes at least part of various processing, or γ: a combination of those. The processor includes a CPU and a memory such as a RAM and a ROM, and the memory stores program codes or commands configured to execute processing on the CPU. The memory, or a computer readable medium includes any readable medium accessible by a general purpose or special purpose computer.

The control unit 19 receives an instruction from a user via a terminal operated by the user, such as a personal computer and a smartphone. The control unit 19 receives an instruction from a user via wired communication or wireless communication, for example.

The control unit 19 receives a recording instruction from a user. The recording instruction is an instruction for causing the recording device 10 to perform recording. When the recording instruction is received from a user, the control unit 19 starts recording on the medium 99. In other words, when the recording instruction is received, the control unit 19 controls the recording unit 12 to record an image on the medium 99. The recording instruction includes image data. The control unit 19 causes the recording unit 12 to record an image based on the image data. The medium 99 having the image recorded thereon is transported in the discharge path 13, and then is stacked on the stacker 14.

The control unit 19 receives a processing instruction from a user. The processing instruction is an instruction for causing the recording device 10 to process the medium 99. When the processing instruction is received from a user, the control unit 19 starts processing of the medium 99. In other words, when the processing instruction is received, the control unit 19 controls the transport unit 15, for example, the pick roller 23, thereby transporting the medium 99 from the stacker 14 to the holding unit 17.

When a user transmits an erroneous recording instruction to the recording device 10, the medium 99 unnecessary for the user is stacked on the stacker 14. The erroneous recording instruction is issued due to an operational error of a user. The erroneous recording instruction is, for example, a recording instruction including erroneous image data, a recording instruction with erroneous setting regarding recording, or the like.

When a user transmits an erroneous recording instruction to the recording device 10, it is troublesome for the user to head for the recording device 10 just to collect the unnecessary medium 99. It is also troublesome for the user to separately execute processing of the medium 99 in addition to collecting the medium 99. However, in view of confidentiality protection, it is not preferable to leave the unnecessary medium 99 stacked on the stacker 14. In this case, the user transmits the processing instruction to the recording device 10. With this, the medium 99 unnecessary for the user is processed, and hence usability of the recording device 10 is improved.

The recording device 10 may be shared by a plurality of persons. Thus, the medium 99 belonging to a first user and the medium 99 belonging to a second user are stacked on the stacker 14 in some cases. In this case, for example, it is inconvenient for the second user when all the media 99 stacked on the stacker 14 are transported to the holding unit 17 due to the processing instruction from the first user. Even when only the media 99 belonging to the first user are stacked on the stacker 14, both the medium 99 necessary for the first user and the medium 99 unnecessary for the first user are stacked on the stacker 14 in some cases. In this case, it is inconvenient for the first user when all the media 99 stacked on the stacker 14 are transported to the holding unit 17 due to the processing instruction from the first user. Thus, in the recording device 10, it is required to determine the medium 99 being a processing target from the plurality of media 99.

When the medium 99 is processed, the control unit 19 determines the medium 99 being a processing target from the plurality of media 99. Specifically, the control unit 19 determines the medium 99 being a processing target from the plurality of media 99, based on indication data A2. The indication data A2 is data serving as an index for determining whether to transport the medium 99 to the holding unit 17, in other words, whether to process the medium 99.

In the first exemplary embodiment, the indication data A2 is image data transmitted from a user. In other words, similarly to the recording instruction, when the processing instruction is transmitted, the user transmits the image data to the recording device 10. In the first exemplary embodiment, the processing instruction includes the image data. When the processing instruction is received, the control unit 19 stores, as the indication data A2, the image data included in the processing instruction.

When the recording instruction is received, the control unit 19 may store the image data included in the recording instruction. In this case, when the processing instruction is transmitted to the control unit 19, the user selects one or a plurality pieces of image data from the image data stored in the control unit 19. The image data selected from the user is the indication data A2.

The control unit 19 compares the read data A1 and the indication data A2 with each other. In the first exemplary embodiment, the control unit 19 compares an image of the read data A1 and an image of the indication data A2 with each other. The control unit 19 calculates an image matching rate between the read data A1 and the indication data A2. The control unit 19 calculates the image matching rate by comparing the read data A1 and the indication data A2 with each other pixel by pixel, for example. The control unit 19 may calculate a matching rate of a character string included in the images, as the image matching rate.

The control unit 19 calculates the image matching rate for each medium 99. In other words, when the reading unit 18 reads both the surfaces of the medium 99, the read data A1 on the front surface and the indication data A2 are compared with each other, and the read data A1 on the back surface and the indication data A2 are compared with each other. In this case, when the read data A1 on the front surface and the indication data A2 completely match with each other, and the read data A1 on the back surface and the indication data A2 completely match with each other, the image matching rate is 100%. When the reading unit 18 reads only one surface of the medium 99, the read data A1 on the one surface and the indication data A2 are compared with each other. In this case, when the read data A1 on the one surface and the indication data A2 completely match with each other, the image matching rate is 100%.

When a plurality of images are included in the indication data A2, all the images included in the indication data A2 and the image of the read data A1 are compared to each other. In this case, a plurality of image matching rates are calculated for one medium 99. The control unit 19 sets, as the image matching rate for the medium 99, the highest image matching rate of the plurality of image matching rates calculated. In other words, the control unit 19 determines whether an image that matches with an image in the read data A1 is included in the indication data A2.

The control unit 19 stores a threshold value relating to the image matching rate. The control unit 19 compares the calculated image matching rate and the threshold value with each other. When the calculated image matching rate is equal to or greater than the threshold value, the control unit 19 determines that the image in the read data A1 and the image in the indication data A2 match with each other. In this case, the control unit 19 determines that the medium 99 is a processing target. When the calculated image matching rate is smaller than the threshold value, the control unit 19 determines that the image in the read data A1 and the image in the indication data A2 do not match with each other. In this case, the control unit 19 determines that the medium 99 is not a processing target.

The control unit 19 determines whether to transport the medium 99 to the holding unit 17, based on the read data A1 and the indication data A2. Specifically, the control unit 19 determines whether to transport the medium 99 to the holding unit 17, based on the image matching rate between the read data A1 and the indication data A2. In the first exemplary embodiment, the control unit 19 determines, in a unit of image data, whether to transport the medium 99 to the holding unit 17. For example, when a user desires to process the medium 99 subjected to recording based on erroneous image data, the processing instruction including the similar image data is transmitted to the recording device 10.

The control unit 19 may be configured so that a user can change the threshold value. In this case, the user operates the recording device 10, and thus changes the threshold value. With this, usability of the recording device 10 is improved. The user may change the threshold value via a personal computer, a smartphone, or the like.

The indication data A2 may be table data in which wave form data and ID data are associated with each other. In this case, the control unit 19 stores the indication data A2 in advance. When the recording instruction is received, the control unit 19 associates a user who transmits the recording instruction and the ID data with each other. Specifically, for example, the control unit 19 associates the user data included in the recording instruction and the ID data with each other. With this, the user data and the wave form data are associated with each other. The user data is data indicating an IP address of a terminal, an account, or the like. The user data and the wave form data may be associated with each other in advance.

The control unit 19 records a bar code on the medium 99, based on the wave form data associated with the user data. With this, the medium 99 and the user are associated with each other. In other words, the bar code recorded on the medium 99 indicates the user who records the image on the medium 99.

When the medium 99 is processed, the control unit 19 causes the reading unit 18 to read the bar code recorded on the medium 99. The control unit 19 compares the read data A1 being wave form data and the indication data A2 being table data with each other. With this, the control unit 19 specifies the user data from the medium 99. When the user data acquired from the medium 99 and the user data included in the processing instruction match with each other, the control unit 19 determines that the medium 99 is a processing target. When the user data acquired from the medium 99 and the user data included in the processing instruction do not match with each other, the control unit 19 determines that the medium 99 is not a processing target.

The control unit 19 determines whether to transport the medium 99 to the holding unit 17, based on the read data A1 and the indication data A2. In this case, the control unit 19 determines whether to transport to the holding unit 17, based on the user data in the read data A1 and the indication data A2. In other words, in this case, the control unit 19 determines, in a unit of user data, whether to transport the medium 99 to the holding unit 17.

The control unit 19 may include a first mode and a second mode. In other words, the control unit 19 may be capable of selecting either of the first mode or the second mode. The first mode and the second mode are modes relating to processing of the medium 99. When processing of the medium 99 is started, the control unit 19 operates in either of the first mode or the second mode. For example, a user selects either of the first mode or the second mode for the control unit 19. For example, the processing instruction may include data designating either of the first mode or the second mode. In other words, when the processing instruction is transmitted to the control unit 19, the user selects either of the first mode for processing the medium 99 or the second mode for processing the medium 99.

In the first mode, the reading unit 18 reads the medium 99, and then the control unit 19 determines whether to transport the medium 99 to the holding unit 17. In other words, in the first mode, as described above, the control unit 19 determines whether to process the medium 99.

In the second mode, the control unit 19 transports the medium 99 to the holding unit 17 without subjecting the medium 99 to be read by the reading unit 18. In other words, in the second mode, the control unit 19 does not determine whether to process the medium 99. Thus, in the second mode, all the media 99 stacked on the stacker 14 are transported to the holding unit 17. Specifically, the second mode is a mode for processing all the media 99 stacked on the stacker 14. In the second mode, the reading unit 18 does not read the medium 99, and hence the medium 99 can be processed in a shorter time period than the first mode.

In the first exemplary embodiment, the recording device 10 includes a branch path 27 and a guide unit 28.

The branch path 27 extends in the housing 11. The branch path 27 is a path branching from the processing path 16. The branch path 27 extends from a branch point 29 in the processing path 16. The branch point 29 is at a position between the reading unit 18 and the holding unit 17 in the processing path 16.

The branch path 27 extends from the branch point 29 to the stacker 14. The starting end of the branch path 27 is located at the branch point 29. The terminal end of the branch path 27 is opened in the opening surface 21. In the first exemplary embodiment, the branch path 27 merges with the discharge path 13, and hence the terminal end of the branch path 27 is also the terminal end of the discharge path 13. In other words, in the first exemplary embodiment, the branch path 27 shares its own part with the discharge path 13. The branch path 27 may be provided independently from the discharge path 13. The medium 99 is transported in the branch path 27, and thus is stacked on the stacker 14 again.

The branch path 27 extends so as to reverse the posture of the transported medium 99 upside down. Thus, when the medium 99 is transported from the processing path 16 to the branch path 27, the posture of the medium 99 is reversed upside down. As a result, in the first exemplary embodiment, the medium 99 is stacked on the stacker 14 again in a posture reversed upside down from the posture previously stacked on the stacker 14. For example, the medium 99 that is stacked on the stacker 14 in a posture with the recording surface facing upward is transported in the branch path 27, and thus is stacked on the stacker 14 again in a posture with the recording surface facing downward. The plurality of media 99 are transported in the branch path 27, and thus are stacked on the stacker 14 again in the stacking order different from the order previously stacked on the stacker 14. Specifically, the stacking order of the media 99 is vertically inverted. This is for the pick roller 23 to start transport to the processing path 16 from the uppermost medium 99 stacked on the stacker 14.

The guide unit 28 is located at a position at which the processing path 16 and the branch path 27 branch from each other, that is, at the branch point 29. In other words, the guide unit 28 is located at the branch point 29. The guide unit 28 guides the medium 99 that is transported in the processing path 16, to the holding unit 17 or the branch path 27. In other words, the guide unit 28 guides the medium 99 that is transported in the processing path 16, to the holding unit 17 or to the stacker 14.

For example, the guide unit 28 is a flap. The guide unit 28 is controlled by the control unit 19. For example, the guide unit 28 is configured to be displaced at the position indicated with the solid line and the position indicated with the two-dot chain line in FIG. 1. The guide unit 28 indicated with the solid line blocks the branch path 27. In this case, the guide unit 28 guides the medium 99 to the holding unit 17. The guide unit 28 indicated with the two-dot line blocks the processing path 16. In this case, the guide unit 28 guides the medium 99 to the branch path 27. In other words, the guide unit 28 guides the medium 99 to the stacker 14.

In the first exemplary embodiment, the recording device 10 includes a detection sensor 31. The detection sensor 31 is a sensor that detects the medium 99 stacked on the stacker 14. The detection sensor 31 may be an optical sensor or an ultrasonic wave sensor, for example. The detection sensor 31 transmits a detection result to the control unit 19. The detection result of the detection sensor 31 enables the control unit 19 to determine whether there is the medium 99 on the stacker 14.

In the first exemplary embodiment, the recording device 10 includes a moving mechanism 32. The moving mechanism 32 is a mechanism that vertically moves the stacker 14. In the first exemplary embodiment, the moving mechanism 32 includes a hopper 33. The hopper 33 is located below the stacker 14. The hopper 33 is mounted to the stacker 14. When the hopper 33 extends or contracts, the stacker 14 vertically moves.

The moving mechanism 32 includes a rack 34 and a pinion 35. The rack 34 is coupled to the hopper 33 so as to operate with the hopper 33 in an interlocking manner. The pinion 35 meshes with the rack 34. The pinion 35 is controlled by the control unit 19. When the pinion 35 rotates, the rack 34 moves. When the rack 34 moves, the hopper 33 extends or contracts. In this manner, when the control unit 19 controls the pinion 35, the position of the stacker 14 is vertically changed.

The moving mechanism 32 vertically moves the stacker 14 in accordance with the amount of the media 99 stacked on the stacker 14. Depending on the amount of the media 99 stacked on the stacker 14, the position of the uppermost medium 99 of the plurality of media 99 stacked on the stacker 14 and the position of the starting end of the processing path 16 are shifted from each other in some cases. In this case, it is difficult to transport the media 99 stacked on the stacker 14 to the processing path 16. In view of this, when the moving mechanism 32 vertically moves the stacker 14, the position of the uppermost medium 99 of the plurality of media 99 stacked on the stacker 14 and the position of the starting end of the processing path 16 can be aligned with each other. With this, it is easy to transport the media 99 stacked on the stacker 14 to the processing path 16.

Next, a routine executed by the control unit 19 is described. When the processing instruction is received from a user, the control unit 19 starts a routine relating to processing of the medium 99. In the first exemplary embodiment, when the processing instruction is received from a user, the control unit 19 starts a routine illustrated in FIG. 2.

Figure 2:
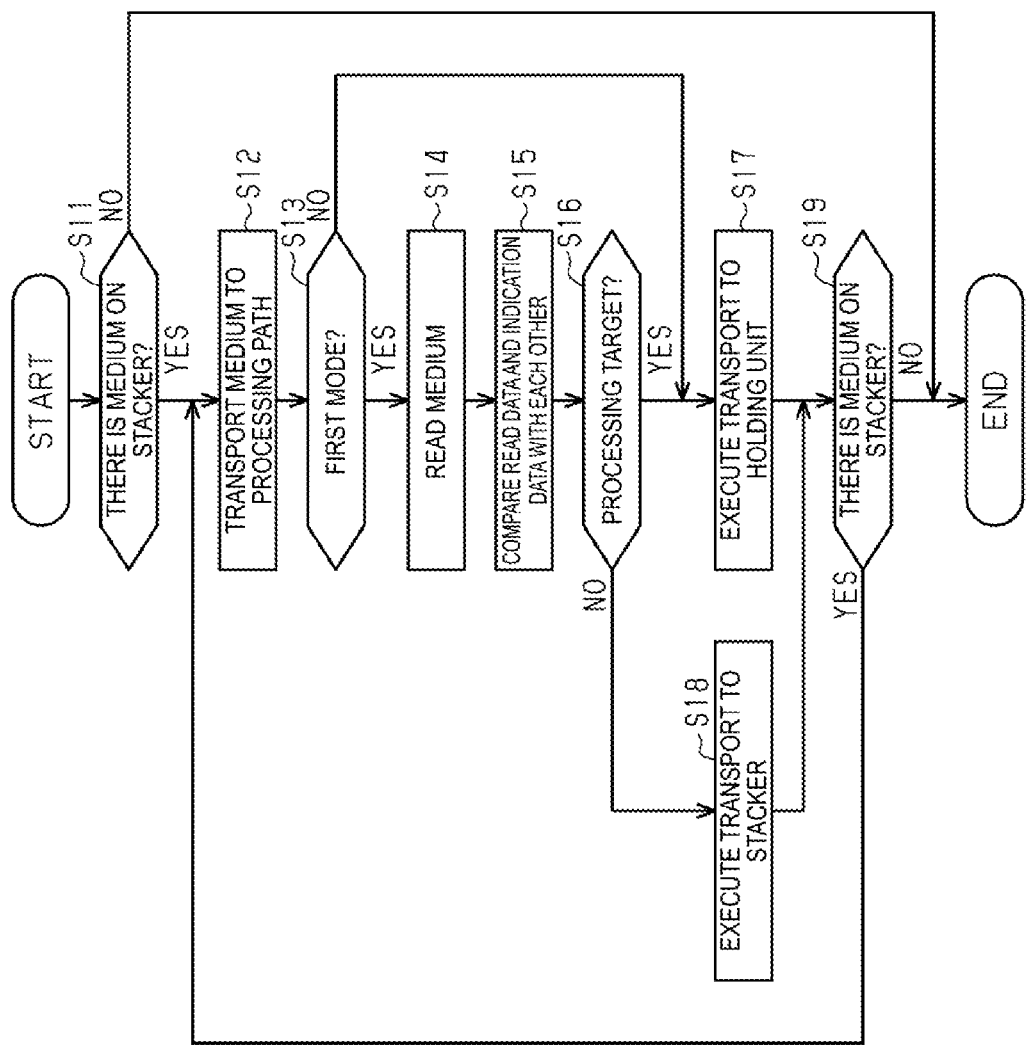
FIG. 2 is a flowchart illustrating one example of a routine executed by a control unit.

As illustrated in FIG. 2, in Step S11, the control unit 19 determines whether there is the medium 99 on the stacker 14. The control unit 19 determines presence or absence of the medium 99 stacked on the stacker 14, based on the detection result of the detection sensor 31. When it is determined that the medium 99 is present on the stacker 14, the control unit 19 proceeds the processing to Step S12. When the control unit 19 determines that the medium 99 is absent on the stacker 14, the routine is terminated.

In Step S12, the control unit 19 transports the medium 99 to the processing path 16. In other words, the control unit 19 drives the pick roller 23, and thus transports the medium 99 from the stacker 14 to the processing path 16. In this case, the control unit 19 transports the media 99 stacked on the stacker 14 to the processing path 16 one by one.

In Step S13, the control unit 19 determines whether the first mode is selected. For example, the control unit 19 determines whether data designating the first mode or data designating the second mode is included in the processing instruction. The control unit 19 may determine whether a mode that is currently selected is the first mode or the second mode. When the first mode is selected, the control unit 19 proceeds the processing to Step S14. When the second mode is selected, the control unit 19 proceeds the processing to Step S17.

In Step S14, the control unit 19 causes the reading unit 18 to read the medium 99. With this, the control unit 19 acquires the read data A1 relating to the medium 99.

In Step S15, the control unit 19 compares the read data A1 and the indication data A2 with each other. In the first exemplary embodiment, the control unit 19 calculates the image matching rate between the read data A1 and the indication data A2. Specifically, the control unit 19 calculates the image matching rate between the image recorded on the medium 99 and the image in the image data transmitted from the user. In other words, the control unit 19 executes image determination.

In Step S16, the control unit 19 determines whether the medium 99 is a processing target, based on the comparison result acquired in Step S15. In the first exemplary embodiment, the control unit 19 determines whether the image matching rate between the read data A1 and the indication data A2 is equal to or greater than the threshold value. When the image matching rate is equal to or greater than the threshold value, it is determined that the medium 99 is a processing target. Then, the control unit 19 proceeds the processing to Step S17. When the image matching rate is smaller than the threshold value, it is determined that the medium 99 is not a processing target. Then, the control unit 19 proceeds the processing to Step S18.

In Step S17, the control unit 19 transports the medium 99 to the holding unit 17. The control unit 19 controls the guide unit 28, thereby guiding the medium 99 to the holding unit 17. The medium 99 is transported to the holding unit 17, and then the medium 99 is processed.

In Step S18, the control unit 19 transports the medium 99 to the stacker 14. The control unit 19 controls the guide unit 28, thereby guiding the medium 99 to the branch path 27. As a result, the medium 99 is stacked on the stacker 14 again. In this manner, in Step S16, the control unit 19 determines whether to transport the medium 99 to the holding unit 17.

Similarly to Step S11, in Step S19, the control unit 19 determines whether there is the medium 99 on the stacker 14. The control unit 19 determines presence or absence of the medium 99 stacked on the stacker 14, based on the detection result of the detection sensor 31. When it is determined that the medium 99 is present on the stacker 14, the control unit 19 returns the processing to Step S12. In other words, the control unit 19 repeats the routine illustrated in FIG. 2 until no medium 99 is left on the stacker 14. When the control unit 19 determines that the medium 99 is absent on the stacker 14, the routine is terminated.

In the first exemplary embodiment, when the medium 99 is transported to the branch path 27, the medium 99 is returned to the stacker 14. Thus, when the medium 99 is returned to the stacker 14 before the routine is terminated, there may be a risk that the detection sensor 31 repeatedly detects the medium 99 that is stacked on the stacker 14 again. In this case, there may be a risk that the routine does not end. Thus, in the first exemplary embodiment, it is preferred that the amount of the media 99 stacked on the stacker 14 be small so that the routine is terminated before the medium 99 transported in the branch path 27 is stacked on the stacker 14 again.

Next, the functions and effects of the first exemplary embodiment are described.

(1) When the processing instruction is received from a user, the control unit 19 causes the pick roller 23 to transport the medium 99 from the stacker 14 to the processing path 16. The control unit 19 determines whether to transport the medium 99 to the holding unit 17, based on the read data A1 and the indication data A2.

According to the configuration described above, when the processing instruction is received from a user, which is regarded as a trigger, the control unit 19 determines whether to transport the medium 99 from the stacker 14 to the holding unit 17. Thus, there is no risk that the medium 99 is automatically transported from the stacker 14 to the holding unit 17 against the intension of the user. Therefore, usability of the recording device 10 is improved.

(2) The control unit 19 determines whether to transport the medium 99 to the holding unit 17, based on the image matching rate between the read data A1 and the indication data A2.

According to the configuration described above, the control unit 19 is capable of determining whether to transport the medium 99 to the holding unit 17, based on the image matching rate.

(3) The branch path 27 extends from the position between the reading unit 18 and the holding unit 17 in the processing path 16, to the stacker 14.

According to the configuration described above, the medium 99 that is determined not to be transported to the holding unit 17 is returned to the stacker 14 through the branch path 27. Thus, usability is improved for a user.

(4) In the first mode, the control unit 19 causes the reading unit 18 to read the medium 99, and determines whether the medium 99 is transported to the holding unit 17 based on the read data A1 and the indication data A2. In the second mode, the control unit 19 transports the medium 99 to the holding unit 17 without subjecting the medium 99 to be read by the reading unit 18. According to the configuration described above, in the second mode, the reading unit 18 does not read the medium 99. Thus, the medium 99 is transported to the holding unit 17 in a shorter time period than the first mode. Thus, a processing speed of the processing system is improved.

(5) The recording device 10 being the processing system includes the detection sensor 31 that detects the medium 99 stacked on the stacker 14.

According to the configuration described above, the detection sensor 31 enables the control unit 19 to determine presence or absence of the medium 99 stacked on the stacker 14.

(6) The pick roller 23 contacts with the uppermost medium 99 of the plurality of media 99 stacked on the stacker 14.

According to the configuration described above, the pick roller 23 transports the plurality of media 99 stacked on the stacker 14 to the processing path 16, sequentially from the uppermost medium 99. The load of the other medium 99 is not applied to the uppermost medium 99 of the plurality of media 99 stacked on the stacker 14. Thus, the pick roller 23 easily transports the medium 99 from the stacker 14 to the processing path 16.

(7) The recording device 10 being the processing system includes the moving mechanism 32 that vertically moves the stacker 14.

According to the configuration described above, the moving mechanism 32 is capable of vertically moving the stacker 14 in accordance with the amount of the media 99 stacked on the stacker 14. Thus, the pick roller 23 easily transports the medium 99 from the stacker 14 to the processing path 16.

Second Exemplary Embodiment

Next, a processing system according to a second exemplary embodiment is described. Similarly to the first exemplary embodiment, the processing system according to the second exemplary embodiment is embodied as the recording device 10. The second exemplary embodiment is only different from the first exemplary embodiment in a part of the configurations. Thus, the configuration of the second exemplary embodiment which is different from that of the first exemplary embodiment is mainly described.

Figure 3:
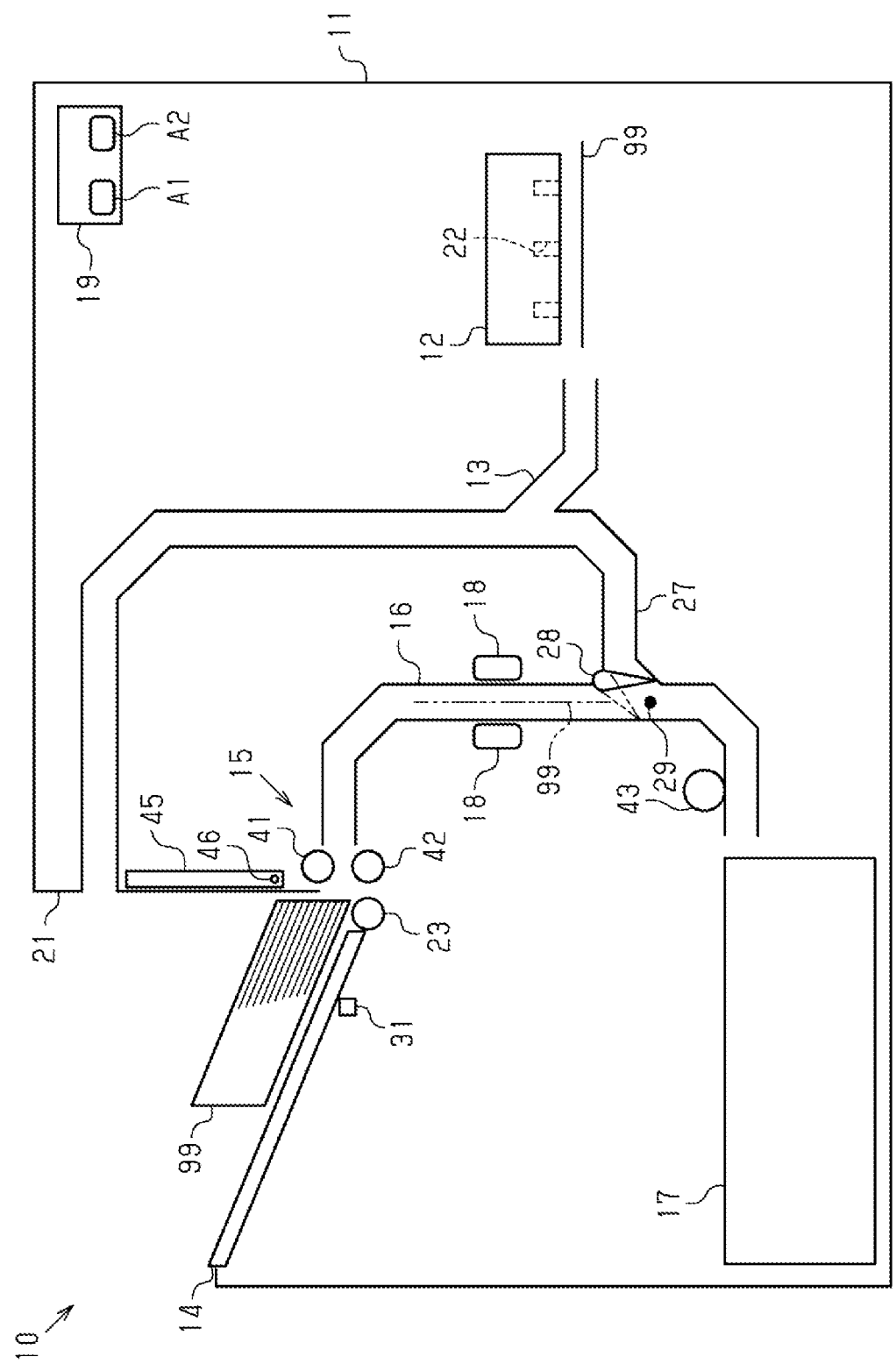
FIG. 3 is a side view of a recording device, for illustrating a processing system according to a second exemplary embodiment.

As illustrated in FIG. 3, in the second exemplary embodiment, the transport unit 15 includes the pick roller 23, a feed roller 41, a retard roller 42, and a switchback roller 43.

In the second exemplary embodiment, the pick roller 23 is fixed to the housing 11 unlike the first exemplary embodiment. In other words, the pick roller 23 does not move with respect to the housing 11.

The pick roller 23 is located at a position adjacent to the stacker 14. In the second exemplary embodiment, the pick roller 23 contact with the medium 99 stacked on the stacker 14 from below. When the plurality of media 99 are stacked on the stacker 14, the pick roller 23 contacts with the lowermost medium 99 of the plurality of media 99 stacked on the stacker 14. Therefore, the pick roller 23 transports the plurality of media 99 to the processing path 16, sequentially from the lowermost medium 99.

In the second exemplary embodiment, the pick roller 23 always contacts with the medium 99 stacked on the stacker 14. In the second exemplary embodiment, the medium 99 can be transported from the stacker 14 to the processing path 16, without moving the pick roller 23, unlike the first exemplary embodiment.

In the second exemplary embodiment, regardless of the amount of the media 99 stacked on the stacker 14, the positional relationship established between the position of the lowermost medium 99 on the stacker 14 and the position of the starting end of the processing path 16 does not change. Therefore, in other words, in the second exemplary embodiment, there is no need to vertically move the stacker 14 in accordance with the amount of the media 99 stacked on the stacker 14, unlike the first exemplary embodiment. In the second exemplary embodiment, the starting end of the processing path 16 is opened at the position continuous with the stacker 14 in the opening surface 21.

In the second exemplary embodiment, the plurality of media 99 stacked on the stacker 14 are transported in the branch path 27, and thus are stacked on the stacker 14 again in the same stacking order as the order previously stacked on the stacker 14. This is for the pick roller 23 to start transport to the processing path 16 from the lowermost medium 99 stacked on the stacker 14.

The feed roller 41 and the retard roller 42 contact with the medium 99 transported by the pick roller 23. In the second exemplary embodiment, the feed roller 41 and the retard roller 42 are located between the pick roller 23 and the processing path 16. The feed roller 41 and the retard roller 42 nip the medium 99 therebetween. The feed roller 41 and the retard roller 42 rotate while nipping the medium 99 therebetween, and thus transport the medium 99 to the processing path 16.

The feed roller 41 and the retard roller 42 are configured so as to separate the media 99 one by one. For example, a frictional coefficient of the retard roller 42 with respect to the medium 99 is higher than a frictional coefficient of the feed roller 41 with respect to the medium 99. The retard roller 42 rotates following the feed roller 41. With this, the feed roller 41 and the retard roller 42 separate the media 99 one by one. The feed roller 41 and the retard roller 42 may be adopted in the first exemplary embodiment.

In the second exemplary embodiment, the feed roller 41 contacts the medium 99 from above. In the second exemplary embodiment, the retard roller 42 contacts the medium 99 from below. Thus, in the second exemplary embodiment, the feed roller 41 and the retard roller 42 are vertically arrayed.

The switchback roller 43 is located along the processing path 16. Specifically, the switchback roller 43 is located between the branch point 29 and the holding unit 17 in the processing path 16. The switchback roller 43 rotates so as to perform switchback on the medium 99. In other words, the switchback roller 43 performs transport in a direction from the holding unit 17 to the branch point 29 in the processing path 16. The switchback roller 43 switches back the medium 99, and thus transports the medium 99 to the branch path 27.

As described in the first exemplary embodiment, the medium 99 is directly transported from the processing path 16 to the branch path 27, and then the posture of the medium 99 is reversed upside down. In view of this, in the second exemplary embodiment, the medium 99 that is performed switchback by the switchback roller 43 is transported from the processing path 16 to the branch path 27. As a result, in the second exemplary embodiment, the medium 99 is stacked on the stacker 14 again in the same posture previously stacked on the stacker 14, unlike the first exemplary embodiment. In other words, in the second exemplary embodiment, the medium 99 is stacked on the stacker 14 again without reversing the posture upside down. For example, the medium 99 that is stacked on the stacker 14 in a posture with the recording surface facing upward is transported in the branch path 27, and thus is stacked on the stacker 14 again in a posture with the recording surface facing upward.

In the second exemplary embodiment, the detection sensor 31 is located below the stacker 14. In the second exemplary embodiment, the detection sensor 31 detects the medium 99 in an indirect manner instead of directly detecting the medium 99, unlike the first exemplary embodiment. For example, the detection sensor 31 may be an optical non-contact sensor or a contact sensor.

In the second exemplary embodiment, the recording device 10 includes a sensor flag 45. One end of the sensor flag 45 is mounted to the housing 11. The sensor flag 45 includes a shaft 46. The sensor flag 45 is mounted to the housing 11 through intermediation of the shaft 46. The sensor flag 45 is configured to rotate about the shaft 46. In general, the sensor flag 45 is accommodated in the housing 11. Thus, in general, the sensor flag 45 does not prevent the medium 99 falling from the discharge path 13 from being stacked on the stacker 14. The sensor flag 45 rotates, and thus protrudes from the opening surface 21.

When the control unit 19 receives the processing instruction, the sensor flag 45 rotates. At this timing, the sensor flag 45 performs one rotation. The sensor flag 45 rotates so as to approach the stacker 14 from above. In other words, in FIG. 3, the sensor flag 45 rotates in a counterclockwise direction.

Figure 4:
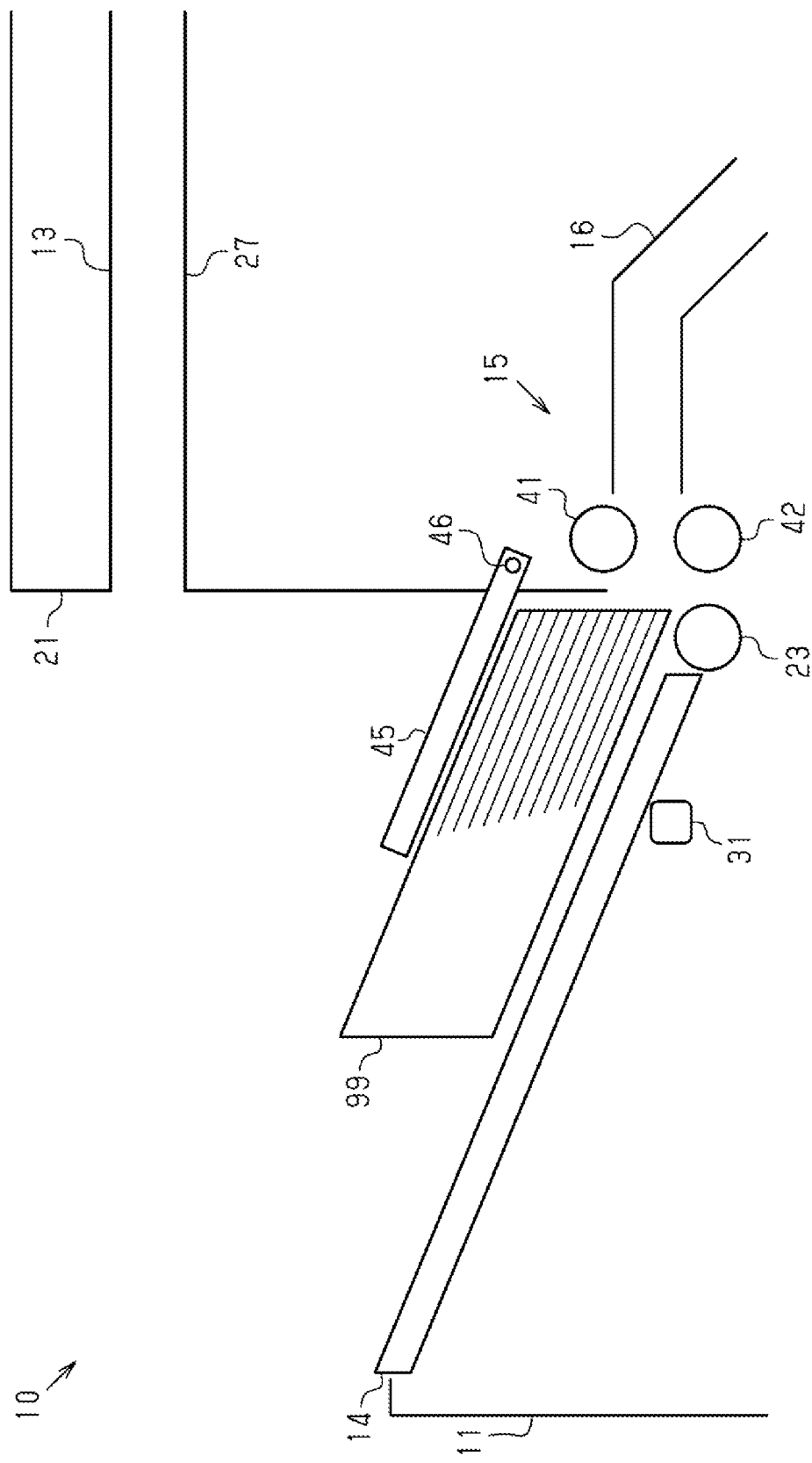
FIG. 4 is a side view of a state in which a sensor flag contacts with a medium.

As illustrated in FIG. 4, the sensor flag 45 rotates, and thus contacts with the medium 99 stacked on the stacker 14. Specifically, the sensor flag 45 contacts with the uppermost medium 99 of the plurality of media 99 stacked on the stacker 14.

Figure 5:
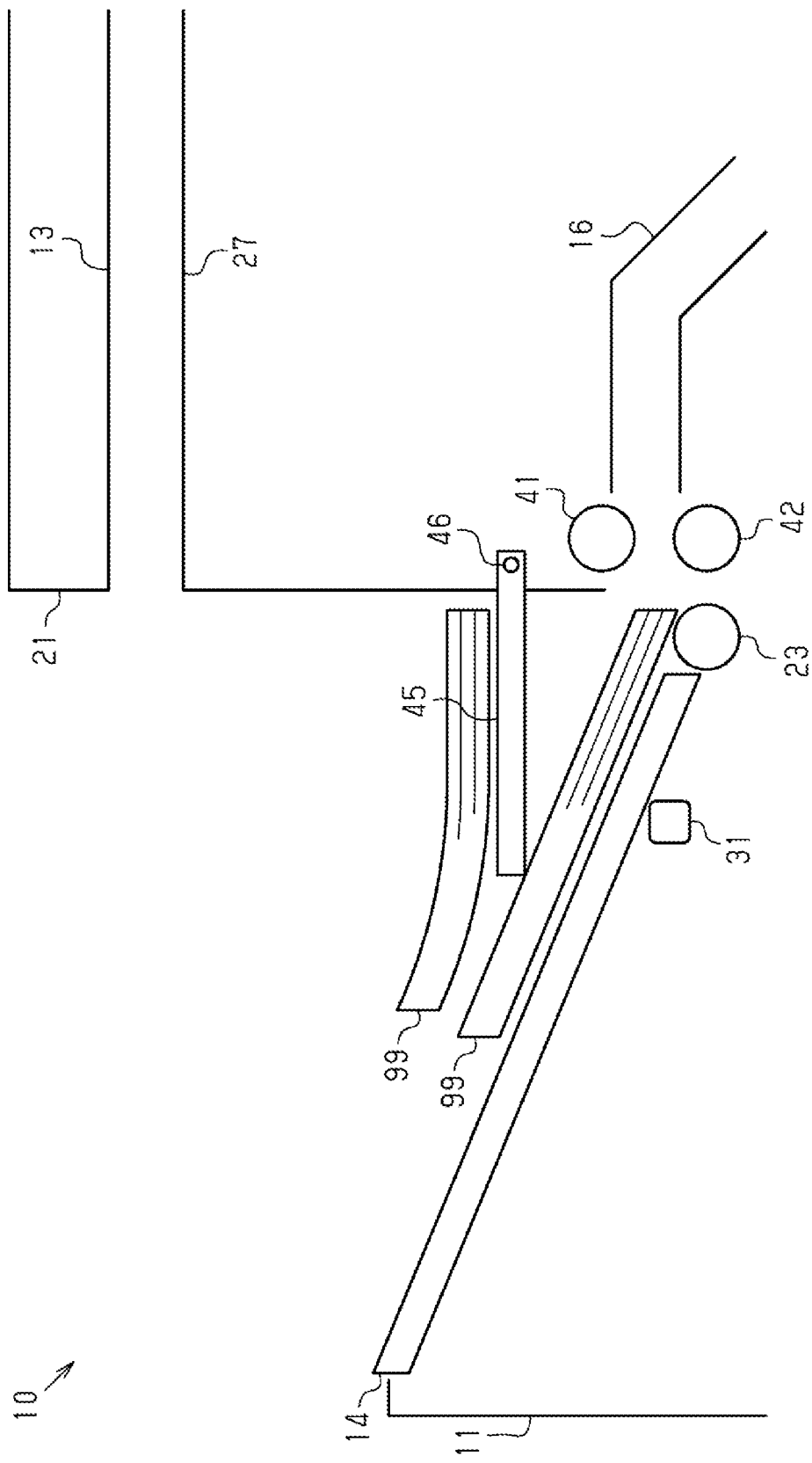
FIG. 5 is a side view of a state in which a medium is stacked on the sensor flag.

As illustrated in FIG. 5, the sensor flag 45 further rotates as the amount of the media 99 stacked on the stacker 14 is reduced by transporting the media 99 to the processing path 16. While the sensor flag 45 rotates, the medium 99 that is transported in the branch path 27 and returned to the stacker 14 is stacked on the sensor flag 45. In this case, the sensor flag 45 is located between the medium 99 that is not transported to the processing path 16 and the medium 99 that is transported to the processing path 16, on the stacker 14. In other words, the sensor flag 45 sorts the medium 99 that is not transported to the processing path 16 and the medium 99 that is transported to the processing path 16, from each other on the stacker 14. In this manner, the sensor flag 45 sorts the medium 99 that is not determined whether to be a processing target and the medium 99 that is determined whether to be a processing target, from each other on the stacker 14.

Figure 6:
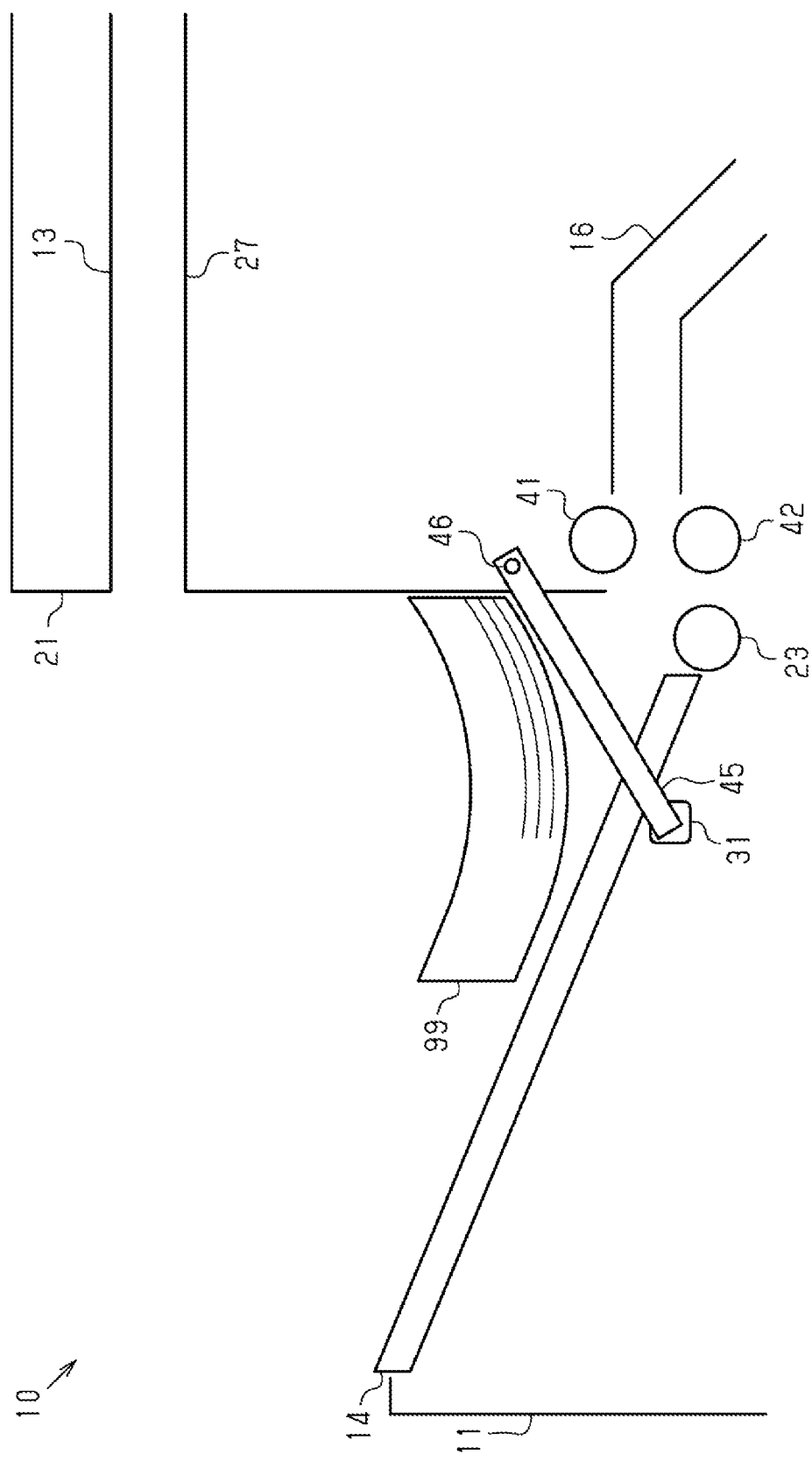
FIG. 6 is a side view of a state in which a detection sensor detects the sensor flag.

As illustrated in FIG. 6, when all the media 99 stacked on the stacker 14 are transported in the processing path 16, the sensor flag 45 rotates to pass through the stacker 14. For example, a slit is formed in the stacker 14 so as to allow the sensor flag 45 to pass therethrough. With this, the sensor flag 45 arrives at the detection sensor 31. In the second exemplary embodiment, the distal end of the sensor flag 45 arrives at the detection sensor 31. Then, the detection sensor 31 detects the sensor flag 45.

When the detection sensor 31 detects the sensor flag 45, the control unit 19 determines that the medium 99 is absent on the stacker 14. More specifically, the control unit 19 determines that the medium 99 that is not determined whether to be a processing target is not stacked on the stacker 14. The control unit 19 determines that the medium 99 is present on the stacker 14 until the detection sensor 31 detects the sensor flag 45.

Figure 7:
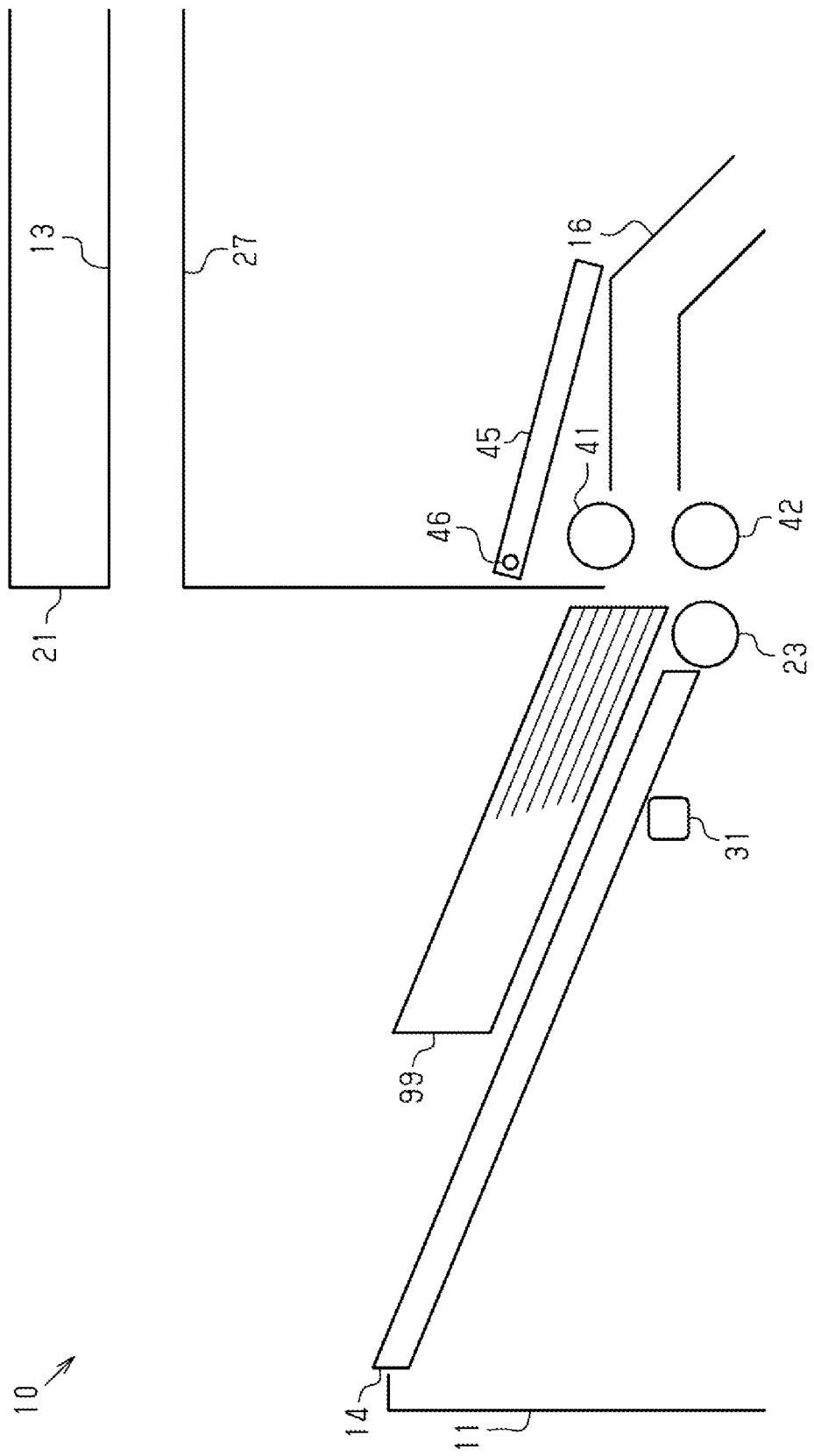
FIG. 7 is a side view of a state in which the sensor flag is returned to its original position.

As illustrated in FIG. 7, the sensor flag 45 further rotates from the position detected by the detection sensor 31. When the sensor flag 45 rotates, the medium 99 stacked on the sensor flag 45 falls onto the stacker 14. The sensor flag 45 rotates, and thus is returned to the original position. The sensor flag 45 is returned to the original position, and then stops. When the control unit 19 receives the processing instruction, the sensor flag 45 rotates again.

In the second exemplary embodiment, the sensor flag 45 removes a risk that the medium 99 returned to the stacker 14 is transported again to the processing path 16, unlike the first exemplary embodiment. Thus, regardless of the amount of the media 99 stacked on the stacker 14, the control unit 19 can execute the routine relating to processing of the medium 99. In other words, in the second exemplary embodiment, regardless of the amount of the media 99 stacked on the stacker 14, the control unit 19 can determine whether the medium 99 is a processing target.

According to the second exemplary embodiment, the following effects can be obtained in addition to the effects (1) to (5) described above.

(8) The switchback roller 43 switches back the medium 99, and thus transports the medium 99 from the processing path 16 to the branch path 27.

According to the configuration described above, when the medium 99 is switched back and transported from the processing path 16 to the branch path 27, the medium 99 is stacked on the stacker 14 again in the same posture previously stacked on the stacker 14. In other words, in a case in which the medium 99 is stacked on the stacker 14 in a posture with the recording surface facing upward, when the medium 99 is switched back and transported from the processing path 16 to the branch path 27, the medium 99 is stacked on the stacker 14 again in the posture with the recording surface facing upward. As described above, the posture of the medium 99 returned to the stacker 14 does not change, and hence usability is improved for a user.

(9) The pick roller 23 contacts with the lowermost medium 99 of the plurality of media 99 stacked on the stacker 14.

According to the configuration described above, the pick roller 23 transports the plurality of media 99 stacked on the stacker 14 to the processing path 16, sequentially from the lowermost medium 99. The load of the other medium 99 is applied to the lowermost medium 99 of the plurality of media 99 stacked on the stacker 14. With this, the lowermost medium 99 of the plurality of media 99 stacked on the stacker 14 is pressed against the pick roller 23. Thus, the pick roller 23 is capable of stably transporting the medium 99 from the stacker 14 to the processing path 16.

Third Exemplary Embodiment

Next, a processing system according to a third exemplary embodiment is described. The processing system according to the third exemplary embodiment is embodied as a sorting device. For example, the sorting device may be integrated with a processing device that subjects the medium 99 to staple processing and punching processing. In the third exemplary embodiment, the recording unit 12 is not provided, unlike the first exemplary embodiment. In the third exemplary embodiment, the medium 99 on which an image is recorded in advance is stacked on the stacker 14. In the third exemplary embodiment, the configurations common to the first exemplary embodiment are denoted with the similar reference symbols. The points of the third exemplary embodiment which are different from the first exemplary embodiment are mainly described.

Figure 8:
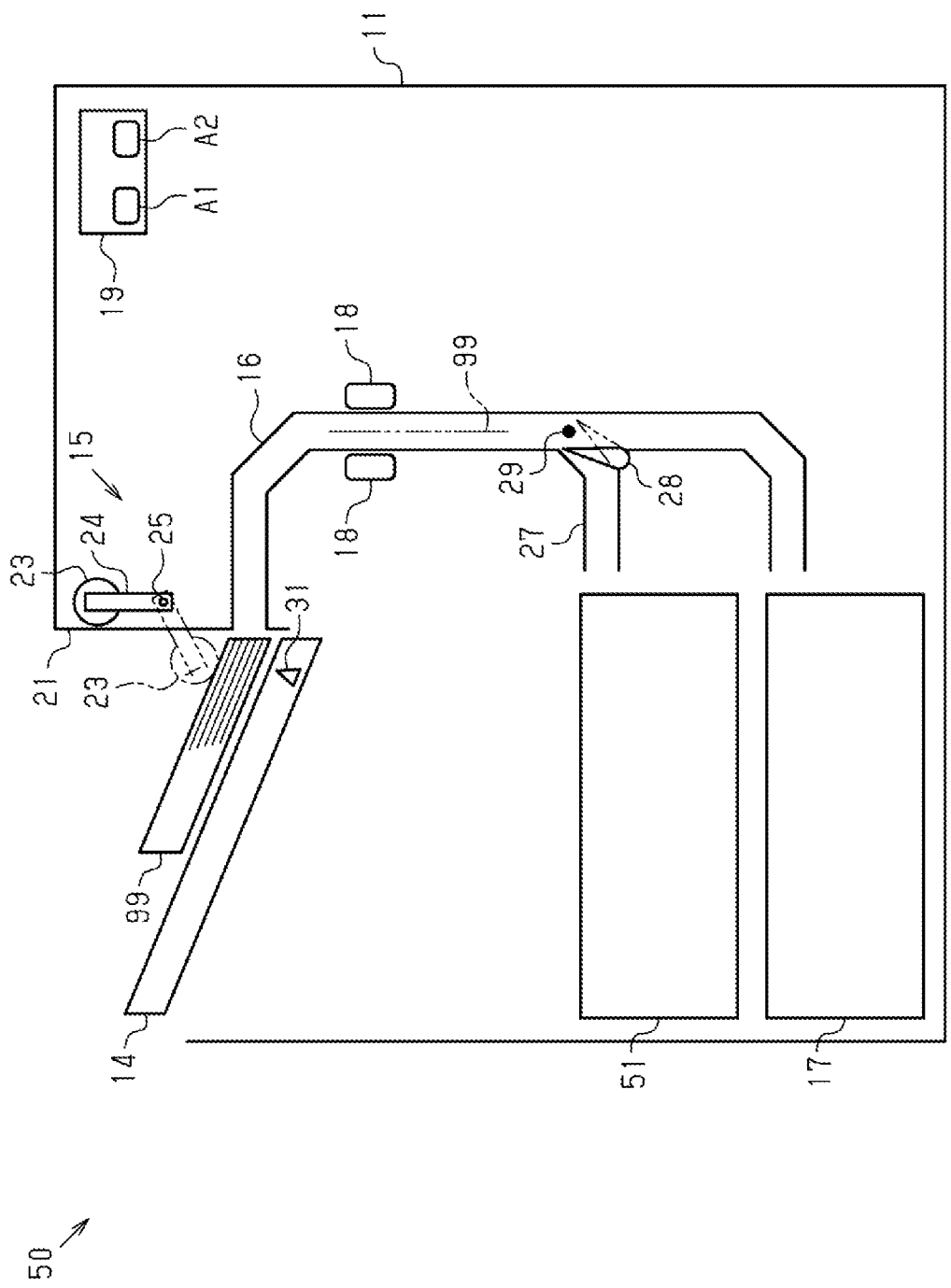
FIG. 8 is a side view of a sorting device, for illustrating a processing system according to a third exemplary embodiment.

As illustrated in FIG. 8, a sorting device 50 includes a retaining unit 51. The retaining unit 51 retains the medium 99 transported in the branch path 27. The medium 99 is stacked in the retaining unit 51 and thus retained. In the third exemplary embodiment, the branch path 27 extends from the branch point 29 to the retaining unit 51. For example, the retaining unit 51 is a cassette, a tray, a box, or the like that retains the medium 99. In the third exemplary embodiment, the retaining unit 51 is located above the holding unit 17. The position of the retaining unit 51 is not limited, and may be below the holding unit 17.

Similarly to the first exemplary embodiment, in the third exemplary embodiment, the pick roller 23 is configured to transport the plurality of media 99 stacked on the stacker 14, sequentially from the uppermost medium 99. Thus, similarly to the first exemplary embodiment, in the third exemplary embodiment, the plurality of media 99 are stacked in the retaining unit 51 in the stacking order different from the order previously stacked on the stacker 14.

Similarly to the second exemplary embodiment, the pick roller 23 may be configured to transport the plurality of media 99 stacked on the stacker 14, sequentially from the lowermost medium 99. In this case, similarly to the second exemplary embodiment, the plurality of media 99 are stacked in the retaining unit 51 in the same stacking order as the order previously stacked on the stacker 14.

Similarly to the first exemplary embodiment, in the third exemplary embodiment, the transport unit 15 does not include the switchback roller 43. Thus, in the third exemplary embodiment, the medium 99 is directly transported from the processing path 16 to the branch path 27. As a result, similarly to the first exemplary embodiment, in the third exemplary embodiment, the medium 99 is stacked on the stacker 14 again in the posture reversed upside down from the posture previously stacked on the stacker 14.

Similarly to the second exemplary embodiment, the transport unit 15 may include the switchback roller 43. In this case, a path in which the switchback roller 43 performs switchback is present, and hence the medium 99 is transported in the path and thus transported from the processing path 16 to the branch path 27. As a result, similarly to the second exemplary embodiment, the medium 99 is stacked in the retaining unit 51 in the same posture previously stacked on the stacker 14.

In the third exemplary embodiment, when the control unit 19 receives the processing instruction, the medium 99 is transported from the stacker 14 to the processing path 16. The control unit 19 determines whether to transport the medium 99 to the holding unit 17, in other words, whether the medium 99 is a processing target, based on the read data A1 and the indication data A2.

When the medium 99 is a processing target, the medium 99 is transported in the processing path 16 and thus transported to the holding unit 17. When the medium 99 is not a processing target, the medium 99 is transported in the branch path 27 and thus transported to the retaining unit 51. As a result, the media 99 stacked on the stacker 14 are sorted into the retaining unit 51 and the holding unit 17. As described above, according to the sorting device 50, the medium 99 unnecessary for a user is removed from the media 99 stacked on the stacker 14.

In the third exemplary embodiment, the medium 99 that is not a processing target is not returned to the stacker 14, but is transported to the retaining unit 51, unlike the first exemplary embodiment and the second exemplary embodiment. According to the third exemplary embodiment, effects similar to those in the first exemplary embodiment and the second exemplary embodiment described above can be obtained.

Each of the exemplary embodiments described above can be implemented with modifications as follows. Each of the exemplary embodiments described above and modified examples thereof to be described below may be implemented in combination within a range in which a technical contradiction does not arise.

The processing system may include a plurality of stackers 14. In this case, the processing path 16 extend from the plurality of stackers 14 to the holding unit 17.

The control unit 19 may include an automatic mode. The automatic mode is a mode in which the control unit 19 automatically starts the routine illustrated in FIG. 2 after elapse of a time period. The automatic mode is selected by a user. The user allows automatic start of the routine, and hence, there is no risk that the medium 99 is automatically transported to the holding unit 17 against the intension of the user. The automatic mode can coexist with the first mode. In this case, the control unit 19 is required to store the indication data A2 in advance for determination. The control unit 19 determines whether to process the medium 99, by using the indication data A2 stored in advance in the control unit 19. The automatic mode can coexist with the second mode.

When the image in the read data A1 and the image in the indication data A2 match with each other, the control unit 19 may determine that the medium 99 is not a processing target. When the user data in the read data A1 and the user data in the processing instruction match with each other, the control unit 19 may determine that the medium 99 is not a processing target. In this case, when the user desires to leave a specific medium 99 out of the plurality of media 99 stacked on the stacker 14, the processing instruction is transmitted to the processing system. In each of the exemplary embodiments described above, when a user desires to process a specific medium 99 out of the plurality of media 99 stacked on the stacker 14, the processing instruction is transmitted to the processing system.

When it is determined that the medium 99 is not a processing target, based on the read data A1 and the indication data A2, the medium 99 is switched back. With this, the control unit 19 may return the medium 99 to the stacker 14 from the processing path 16.

Hereinafter, technical concepts and effects thereof that are understood from the above-described exemplary embodiments and modified examples will be described.

(A) A processing system includes a stacker that one or more media having an image recorded thereon are stacked on, a holding unit configured to hold a medium, a processing path extending from the stacker to the holding unit, a pick roller configured to transport a medium from the stacker to the processing path, a reading unit configured to read a medium in transport through the processing path, and a control unit configured to store indication data indicating an index of whether to transport a medium to the holding unit, wherein, the control unit is configured to, when a processing instruction is received from a user, cause the pick roller to transport a medium from the stacker to the processing path, and determine whether to transport a medium to the holding unit, based on read data and the indication data, the read data being acquired by reading the medium by the reading unit.

According to the configuration described above, when the processing instruction is received from a user, which is regarded as a trigger, the control unit determines whether to transport the medium from the stacker to the holding unit. Thus, there is no risk that the medium is automatically transported from the stacker to the holding unit against the intension of the user. Therefore, usability of the processing system is improved.

(B) In the processing system described above, the read data may be scan data of an image recorded on a medium, the indication data may be image data transmitted from a user, and the control unit may determine whether to transport a medium to the holding unit, based on the image matching rate between the read data and the indication data.

According to the configuration described above, the control unit is capable of determining whether to transport the medium to the holding unit, based on the image matching rate.

(C) The processing system described above may further include a branch path branching from the processing path, wherein the branch path may extend from a position between the reading unit and the holding unit in the processing path to the stacker.

According to the configuration described above, the medium that is determined not to be transported to the holding unit is returned to the stacker through the branch path. Thus, usability is improved for a user.

(D) The processing system described above may further include a switchback roller located at a position between a branch point and the holding unit in the processing path, the branch path branching from the branch point, wherein the switchback roller may perform switchback on a medium to transport the medium from the processing path to the branch path.

According to the configuration described above, when the medium is switched back and transported from the processing path to the branch path, the medium is stacked on the stacker again in the same posture previously stacked on the stacker. In other words, in a case in which the medium is stacked on the stacker in a posture with the recording surface facing upward, when the medium is switched back and transported from the processing path to the branch path, the medium is stacked on the stacker again in the posture with the recording surface facing upward. As described above, the posture of the medium returned to the stacker does not change, and hence usability is improved for a user.

(E) In the processing system described above, the control unit is capable of selecting either of a first mode or a second mode. In the first mode, the control unit may cause the reading unit to read a medium and determine whether to transport the medium to the holding unit, based on the read data and the indication data. In the second mode, the control unit may transport a medium to the holding unit without subjecting the medium to be read by the reading unit.

According to the configuration described above, in the second mode, the reading unit does not read the medium. Thus, the medium is transported to the holding unit in a shorter time period than the first mode. Thus, a processing speed of the processing system is improved.

(F) The processing system described above may further include a detection sensor configured to detect a medium stacked on the stacker.

According to the configuration described above, the detection sensor enables the control unit to determine presence or absence of the medium stacked on the stacker.

(G) In the processing system described above, the pick roller may contact with an uppermost medium of a plurality of media stacked on the stacker.

According to the configuration described above, the pick roller transports the plurality of media stacked on the stacker to the processing path, sequentially from the uppermost medium. The load of the other medium is not applied to the uppermost medium of the plurality of media stacked on the stacker. Thus, the pick roller easily transports the medium from the stacker to the processing path.

(H) The processing system described above may further include a moving mechanism configured to vertically move the stacker.

According to the configuration described above, the moving mechanism is capable of vertically moving the stacker in accordance with the amount of the media stacked on the stacker. Thus, the pick roller easily transports the medium from the stacker to the processing path.

(I) In the processing system described above, the pick roller may contact with a lowermost medium of a plurality of media stacked on the stacker.

According to the configuration described above, the pick roller transports the plurality of media stacked on the stacker to the processing path, sequentially from the lowermost medium. The load of the other medium is applied to the lowermost medium of the plurality of media stacked on the stacker. With this, the lowermost medium of the plurality of media 99 stacked on the stacker 14 is pressed against the pick roller. Thus, the pick roller is capable of stably transporting the medium from the stacker to the processing path.

What is claimed is:

1. A processing system for a recording device, the processing system comprising:
    a recording unit that records an image on at least one medium;
    a transport unit that transports the medium recorded with the image;
    a stacker on which the medium transported by the transport unit is stacked;
    a holding unit configured to hold the medium, the holding unit internally contained within a housing of the recording device;
    a processing path extending from the stacker to the holding unit;
    a pick roller configured to transport the medium from the stacker to the processing path;
    a reading unit configured to read the medium transported through the processing path; and
    a control unit configured to store indication data indicating an index of whether to transport the medium to the holding unit, wherein
    the control unit is configured to,
    when receiving a processing instruction from a user, cause the pick roller to transport the medium from the stacker toward the processing path, and
    determine whether to transport the medium to the holding unit, based on read data and the indication data, the read data being acquired by reading the medium by the reading unit, wherein
    the read data is scan data of an image recorded on the medium,
    the indication data is image data transmitted by a user, and
    the control unit is configured to determine, based on an image matching rate between the read data and the indication data, whether to transport the medium to the holding unit.

2. The processing system according to claim 1, comprising a branch path branching from the processing path, wherein
    the branch path extends from a position between the reading unit and the holding unit in the processing path to the stacker.

3. The processing system according to claim 2, comprising:
    a switchback roller located at a position between the holding unit and a branch point at which the branch path branches from the processing path, wherein
    the switchback roller is configured to perform switchback on a medium to transport the medium from the processing path to the branch path.

4. The processing system according to claim 1, wherein
    the control unit is configured to select a first mode or a second mode,
    in the first mode, the control unit causes the reading unit to read the medium and determines, based on the read data and the indication data, whether to transport the medium to the holding unit, and
    in the second mode, the control unit transports the medium toward the holding unit without reading the medium using the reading unit.

5. The processing system according to claim 1, comprising
    a detection sensor configured to detect the medium stacked on the stacker.

6. The processing system according to claim 1, wherein the pick roller contacts an uppermost medium of a plurality of media stacked on the stacker.

7. The processing system according to claim 6, comprising a moving mechanism configured to vertically move the stacker.

8. The processing system according to claim 1, wherein the pick roller contacts a lowermost medium of a plurality of media stacked on the stacker.

* * * * *